US008013544B2

(12) United States Patent
Negrete et al.

(10) Patent No.: US 8,013,544 B2
(45) Date of Patent: Sep. 6, 2011

(54) DIMMER CONTROL LEAKAGE PULL DOWN USING MAIN POWER DEVICE IN FLYBACK CONVERTER

(75) Inventors: Michael George Negrete, Mountain View, CA (US); Wei Gu, Santa Clara, CA (US)

(73) Assignee: Linear Technology Corporation, Milpitas, CA (US)

( * ) Notice: Subject to any disclaimer, the term of this patent is extended or adjusted under 35 U.S.C. 154(b) by 469 days.

(21) Appl. No.: 12/332,292

(22) Filed: Dec. 10, 2008

(65) Prior Publication Data

US 2010/0141178 A1   Jun. 10, 2010

(51) Int. Cl.
*H05B 37/02* (2006.01)
(52) U.S. Cl. .......... 315/307; 315/291; 315/224; 315/77; 315/209 R; 323/222; 363/21.12
(58) Field of Classification Search .......... 315/192, 315/194, 206, 209 R, 210, 219, 224, 225, 315/244, 246, 247, 248, 250, 260, 274, 276, 315/282, 287, 291, 295, 297, 307, 308, 312, 315/324, 82, 83
See application file for complete search history.

(56) References Cited

U.S. PATENT DOCUMENTS

| 6,304,464 | B1 | 10/2001 | Jacobs et al. |
| 2006/0125418 | A1 | 6/2006 | Bourgault |
| 2006/0170373 | A1* | 8/2006 | Yang .......................... 315/209 R |
| 2006/0192502 | A1 | 8/2006 | Brown et al. |
| 2007/0121349 | A1 | 5/2007 | Mednik et al. |
| 2008/0278092 | A1 | 11/2008 | Lys et al. |
| 2010/0013409 | A1* | 1/2010 | Quek et al. ...................... 315/294 |

OTHER PUBLICATIONS

International Search Report and the Written Opinion of the International Searching Authority issued in International Patent Application No. PCT/US09/66861 dated Jan. 26, 2010.
Supertex Inc. HV9931DB4 "Dimmer Switch Compatible Off-line LED Driver, Universal Input, PFC; 25V, 700mA Load", located at url:www.supertex.com, pp. 2-13.
ST AN2711 Application Note "15 W offline TRIAC Dimmable LED Driver"; Mar. 2008, located at url:www.st.com, pp. 1-31.

* cited by examiner

*Primary Examiner* — Douglas W Owens
*Assistant Examiner* — Jonathan Cooper
(74) *Attorney, Agent, or Firm* — McDermott Will & Emery LLP

(57) ABSTRACT

A flyback controller may receive a chopped and rectified AC voltage from a dimmer control, each cycle of which may have a controllable off period that is substantially attenuated but not always zero due to leakage of the dimmer control, and a controllable on period that substantially tracks the AC voltage. The flyback controller may include a control circuit configured to generate a switching signal based on the signal from the dimmer input. The switching signal may controllably oscillate between its on and off states during the on periods of the chopped and rectified AC voltage so as to controllably regulate current that is delivered by a secondary winding of a transformer in a flyback converter. The switching signal may be in the on state during the off periods of the chopped and rectified AC voltage, thereby preventing a voltage build up from the dimmer control leakage.

22 Claims, 8 Drawing Sheets

DIMMER CONTROL LEAKAGE PULL DOWN USING MAIN POWER DEVICE IN FLYBACK CONVERTER

BACKGROUND

1. Technical Field

This disclosure relates to light emitting diodes (LEDs), dimmer controls, flyback controllers, and power factor correction.

2. Description of Related Art

Cold cathode fluorescent lamps have long-since been used in offices and have become popular in the home. Compared to incandescent lamps, their lumens per watt may be very high, saving energy. However, they may require a high voltage AC inverter and may contain toxic mercury.

Light-emitting diodes (LEDs) are also now capable of providing high light output per watt, comparable to cold cathode fluorescent lamps. Unlike cold cathode fluorescent lamps, moreover, they may not require high voltage and do not usually contain mercury.

Driving LEDs from the 110 volt alternating line current that is typically available, however, may be challenging. Unlike incandescent lamps, for example, the intensity of an LED may be proportional to the current which is delivered through it, not the amount of voltage that is applied across it. Thus, circuitry may be needed to convert the line voltage to a constant current. It may also be desirable to configure this circuitry so that it may drive the LED from the output of a conventional dimmer control, such as one that uses a triac.

One approach has been to convert the output of the dimmer control to a constant current using a flyback converter. Some dimmer controls, however, leak current during periods when their triacs are not firing, i.e., during off periods of their chopped AC voltage output. This leakage may cause a voltage build-up in the flyback controller, which may cause noise, flickering, and/or other undesirable results.

Dedicated hold-off circuits with low current limits have been added in an attempt to address this problem. These circuits may prevent the supply voltage from increasing to a point that might otherwise cause the flyback converter to be energized. However, these dedicated hold-off circuits may require an additional high voltage active device, such as a bipolar transistor. This may add costs, complexity, and size.

SUMMARY

A flyback controller may generate a switching signal that causes a switching system in a flyback converter to deliver current to a primary winding of a transformer in the flyback converter while the switching signal is in an on state and to stop delivering that current while the switching signal is in an off state. The flyback controller may include a dimmer input configured to receive a dimmer signal reflective of a chopped and rectified AC voltage. Each cycle of the dimmer signal may have an off period which is substantially attenuated but not always zero due to leakage of a dimmer control from which the chopped AC voltage originates. Each cycle of the dimmer signal may have an on period which substantially tracks the AC voltage. The ratio of the off period to the on period may be dependent upon a setting of the dimmer control. The flyback controller may include a control circuit configured to generate the switching signal based on the dimmer signal from the dimmer input. The switching signal may controllably oscillate between its on and off states during the on periods of the chopped and rectified AC voltage so as to controllably regulate the current that is delivered by a secondary winding of the transformer. The switching signal may be in the on state during the off periods of the chopped and rectified AC voltage, thereby preventing a voltage build up from the dimmer control leakage.

A powered LED circuit may include a flyback converter. The flyback converter may include a rectification system configured to produce the chopped and rectified AC voltage by rectifying a chopped AC voltage from a dimmer control. The flyback converter may include a transformer having a primary winding and a secondary winding, a switching system configured to controllably deliver current into the primary winding of the transformer, and a flyback controller of the type described. The powered LED circuit may include one or more LEDs configured to receive current that is delivered by the secondary winding of the transformer.

These, as well as other components, steps, features, objects, benefits, and advantages, will now become clear from a review of the following Detailed Description of Illustrative Embodiments, the accompanying drawings, and the claims.

BRIEF DESCRIPTION OF DRAWINGS

The drawings disclose illustrative embodiments. They do not set forth all embodiments. Other embodiments may be used in addition or instead. Details that may be apparent or unnecessary may be omitted to save space or for more effective illustration. Conversely, some embodiments may be practiced without all of the details that are disclosed. When the same numeral appears in different drawings, it is intended to refer to the same or like components or steps.

DETAILED DESCRIPTION OF ILLUSTRATIVE EMBODIMENTS

Illustrative embodiments are now discussed. Other embodiments may be used in addition or instead. Details that may be apparent or unnecessary may be omitted to save space or for a more effective presentation. Conversely, some embodiments may be practiced without all of the details that are disclosed.

Figure 1:
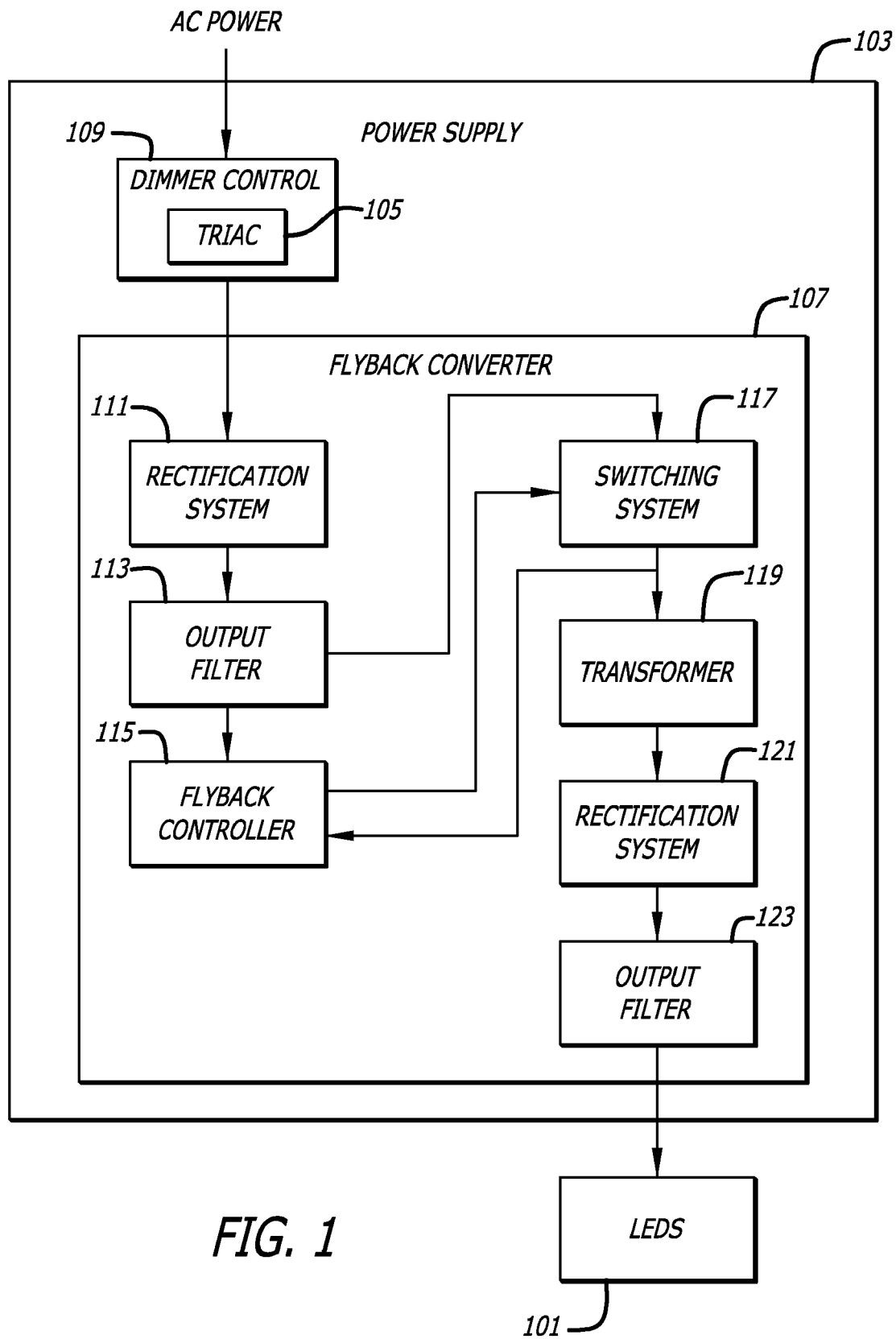
FIG. 1 is a block diagram of an LED circuit powered by a dimmer control and a flyback converter.

FIG. 1 is a block diagram of an LED circuit powered by a dimmer control and a flyback converter. As illustrated in FIG. 1, LEDs 101 may be powered by a power supply 103 that receives AC power.

The number of the LEDs 101 may vary. For example, there may be two, three, five, ten, twenty-five, or a different number. Although referred to in the plural, there may be only a single LED.

The LEDs 101 may be connected in series or in parallel or in a combination of series and parallel. The particular configuration may depend upon the amount of current and voltage which is available to drive the LEDs 101.

The LEDs 101 may be of any type. For example, they may operate at any voltage, at any current, and/or produce any color or combination of colors. The LEDs 101 may all be of the same type of may be of different types.

The power supply 103 may be of any type. For example, the power supply 103 may include a dimmer control 105 and a flyback converter 107.

The dimmer control 105 may be of any type. For example, the dimmer control may include a triac 109 configured with associated circuitry to provide a chopped AC voltage output based on a setting of the dimmer control, such as the rotational position of a knob, the longitudinal position of a slider, and/or the amount of time by which a touch plate has been touched.

The triac may be configured to function as a switch. When open, there may be essentially no output from the triac, except for leakage. When closed, the full magnitude of the AC voltage may be delivered to the output.

The switching of the triac from off to on may be governed by the injection of a signal into a gate of the triac. The circuitry associated with the triac may cause the signal to be injected into the gate at a point in time that corresponds to a phase angle of the alternating current that corresponds to a setting of the dimmer control.

Figure 2:
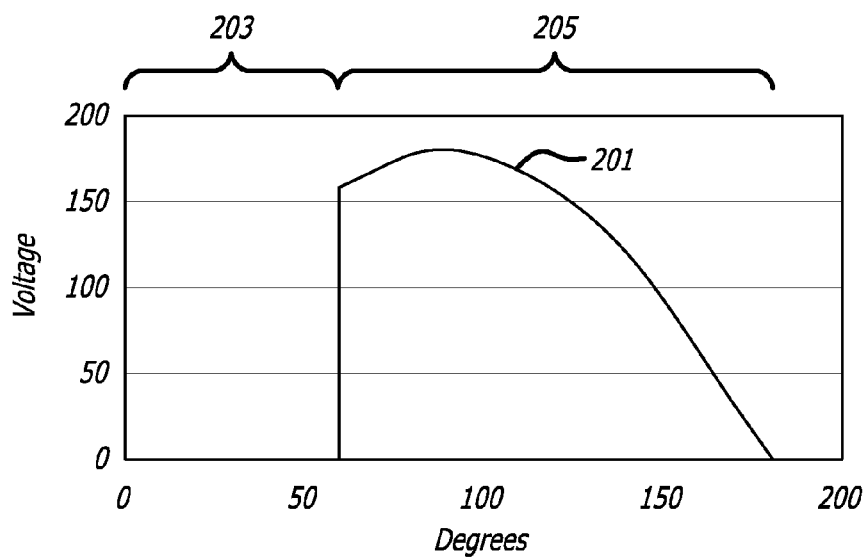
FIG. 2 illustrates a chopped AC output from a dimmer control.

FIG. 2 illustrates a chopped AC output from a dimmer control. As illustrated in FIG. 2, a chopped AC output 201 may be off during an off period 203. A triac may be turned on by a signal at its gate at a phase angle that corresponds to a setting of the dimmer control, such as at 60 degrees as illustrated in FIG. 2. The chopped AC output from the dimmer control may then remain on during an on period 205 until the magnitude of the AC voltage reaches approximately zero at a phase angle of 180 degrees. Once the current though the triac 109 reaches approximately zero, intrinsic characteristics of the triac 109 may cause the triac 109 to shut off. This may prevent any further output from the dimmer control 105 until the triac is again fired by another signal to its gate The gate of the triac 109 may again be energized, again at a phase angle that is set by the associated circuitry in the dimmer control 105 based on a setting of the dimmer control. This may cause the cycle illustrated in FIG. 2 to repeat. However, it may do so in connection with the remaining negative half of the AC cycle (which is not illustrated in FIG. 2). Thus, the next cycle may be a negative cycle, but may otherwise be identical to the one illustrated in FIG. 2.

A devices other than the triac 109 may be used in addition or instead. For example, two SCR's may be used instead. Even a single SCR may be used, but this may result in only the positive or negative portion of the AC voltage being outputted from the dimmer control 105.

Returning to FIG. 1, the flyback converter 107 may be of any type. The flyback converter 107 may include a rectification system 111, an output filter 113, a flyback controller 115, a switching system 117, a transformer 119, a rectification system 121, and/or an output filter 123.

The rectification system 111 may be of any type. For example, it may include a full wave bridge rectifier. Such a full wave bridge rectifier may be configured to convert the positive and negative chopped portions of the AC voltage that are delivered by the dimmer control 105 into all positive chopped portions or into all negative chopped portions, i.e., into a chopped and rectified AC voltage. A half wave bridge rectifier may be used instead, in which case either the positive or negative chopped portions of the output from the dimmer control 105 may be lost.

The output filter 113 may be of any type. The output filter 113 may be configured to filter the chopped and rectified AC voltage from the rectification system 111. For example, the output filter 113 may be a low pass filter. To minimize costs, size, and for other reasons, the amount of filtering provided by the output filter 113 may be minimal. If a low pass filter is used, for example, the low pass filter may have a cutoff frequency that is substantially above the ripple frequency of the chopped and rectified AC voltage from the rectification system 111. For example, it may be sufficient to filter out high frequency noise in the chopped and rectified AC voltage, but not to sustain the output of the output filter 113 during substantial portions of the off periods of the chopped and rectified AC voltage.

The output filter 113 may include a capacitance. The capacitance may be of any value. It may be less than one microfared, such as approximately 0.5 microfared or 0.1 microfared.

The output from the output filter 113 may be delivered to the flyback controller 115 and to the switching system 117.

The flyback controller 115 may be of any type. The flyback controller 115 may be configured to generate a switching signal for controlling delivery of current into a primary winding of the transformer 119. The flyback controller 115 may be configured to generate the switching signal in a manner that causes a constant average output current to be delivered to the LEDs 101 that is a function of the average value of the chopped and rectified AC voltage.

To effectuate this control, the flyback controller 115 may deliver a switching signal to the switching system 117. The switching system 117 may be configured to connect the primary winding of the transformer 119 to the chopped and rectified AC voltage from the output filter 113 in conformance with the switching signal received from the flyback controller 115.

The switching system 117 may be of any type. For example, it may include one or more electronic switches, such as one or more FETS, MOSFETS, IGBTs, and/or BJTs. The switching system 117 may include one or more logic devices that may be used to cause the electronic switches to switch the primary winding of the transformer 119 between the output from the output filter 113 and ground based on the switching signal from the flyback controller 115.

The transformer 119 may be of any type. As indicated, it may have a primary winding which is connected to the output of the output filter 113 through the switching system 117 based on the switching signal. The transformer 119 may include a secondary winding which may be connected to the rectification system 121. The transformer 119 may include one or more additional primary and/or secondary windings, which may be used for other purposes. The turns ratio(s) and other characteristics of the transformer 119 may vary.

The rectification system may be configured to rectify the output from the secondary winding of the transformer 119. For example, the rectification system 121 may include one or more diodes. Half wave rectification may be used.

The output of the rectification system 121 may be connected to the output filter 123. The output filter may be configured to filter the output from the rectification system 121. The output filter may include a capacitance. The capacitance may or may not be sufficient to substantially sustain the output from the rectification system 121 through off periods of the chopped and rectified AC voltage.

The flyback converter 107 may be configured to deliver an output from the output filter 123 to the LEDs 101 that is DC isolated from the chopped AC voltage from the dimmer control 105. The flyback converter 107 may be configured to do so without using any opto-isolator, such as an opto-isolator that provides feedback indicative of the output current from the secondary winding in the transformer 119.

Figure 3:
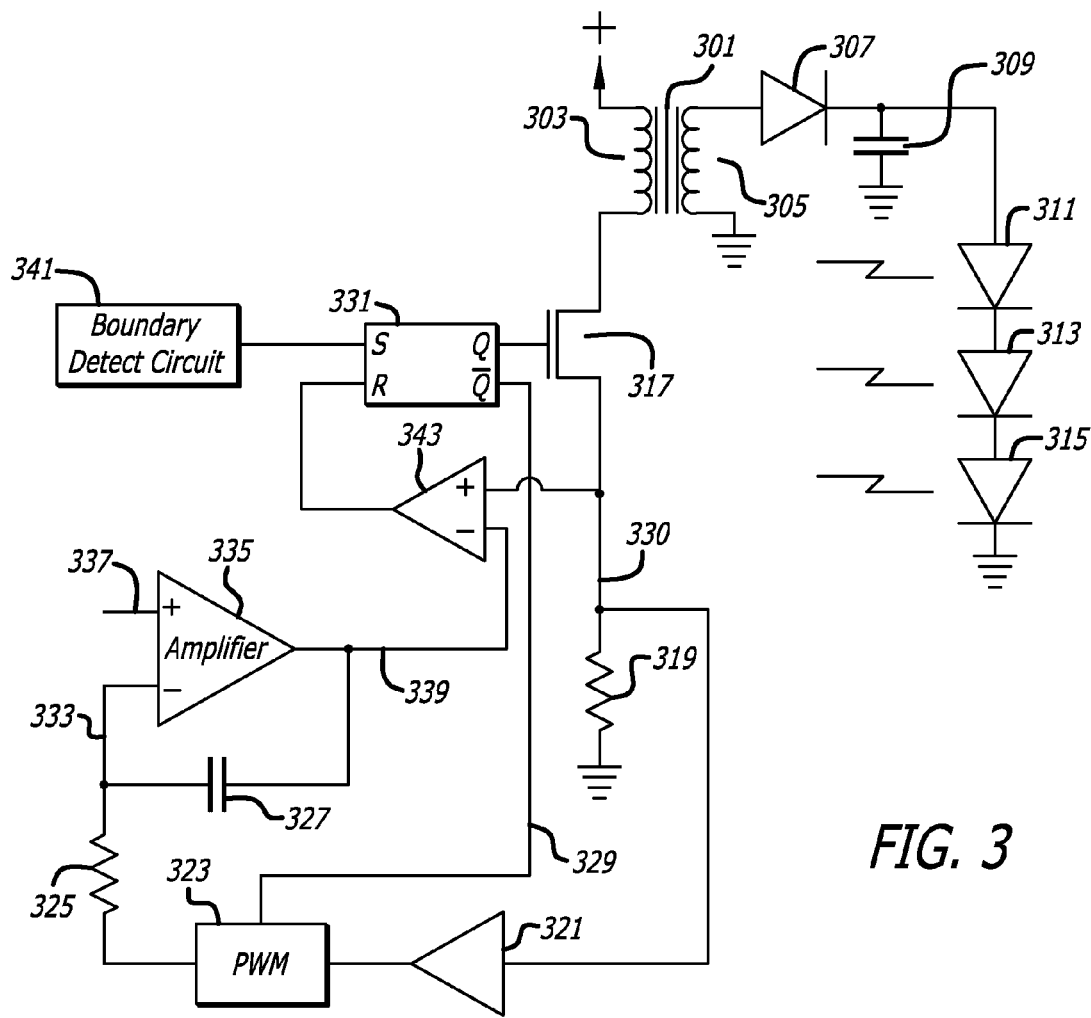
FIG. 3 illustrates a portion of a flyback converter including a flyback controller that includes a output current monitoring circuit.

FIG. 3 illustrates a portion of a flyback converter including a flyback controller that includes an output current monitoring circuit. The circuitry illustrated in FIG. 3 may be used in connection with the dimmer-powered LED circuit illustrated in FIG. 1, in other types of dimmer-powered LED circuits, or in other types of circuits, such as in general purpose flyback converters that are configured to generate a constant-current output. Similarly, the dimmer-powered LED circuit illustrated in FIG. 1 may be implemented with circuitry other than is illustrated in FIG. 3.

As illustrated in FIG. 3, a transformer 301 may have a primary winding 303 and a secondary winding 305. The transformer 301 may correspond to the transformer 119 illustrated in FIG. 1. The transformer 301 may be of any type. It may have one or more additional primary and/or secondary windings, and it may have any turns ratio.

The primary winding 303 of the transformer 301 may be connected to a source of power. Any type of power may be used. For example, the source of power may be a DC source, a full wave rectified AC source, a half wave rectified AC source, or a chopped and rectified source of power from a dimmer control, such as the output from the output filter 113 illustrated in FIG. 1.

The secondary winding 305 of the transformer 301 may be rectified by a diode 307. The diode 307 may correspond to the rectification system 121 illustrated in FIG. 1. The output from the diode 307 may be filtered by a capacitor 309. The capacitor 309 may correspond to the output filter 123 illustrated in FIG. 1. The capacitor 309 may or may not be sufficient to substantially sustain the output from the rectification system 121 through off periods of the chopped and rectified AC voltage.

One or more LEDs may be connected to the output of the capacitor 309, such as the LEDs 311, 313, and 315. The LEDs 311, 313, and 315 may correspond to the LEDs 101 illustrated in FIG. 1 and may be any of the types discussed above in connection with FIG. 1. Although illustrated as being connected in series, the LEDs 311, 313, and 315 may be connected in parallel and/or in a combination of series and parallel. Any different number of LEDs may be used instead.

An FET 317 may be used to controllably connect the other side of the primary winding 303 to ground through a sense resistor 319. The FET 317 may correspond to the switching system 117 illustrated in FIG. 1. Other types of switching systems may be used in addition or instead. The switching system may instead be inserted in series with the other side of the primary winding 303 of the transformer 301.

The circuit illustrated in FIG. 3 may be configured to maintain the average output current in the secondary winding 305 substantially constant, as will become more clear from the discussion below. To accomplish this, the circuitry may monitor the current in the secondary winding.

That current may be monitored by measuring the voltage on the primary winding 303 during periods of time when the secondary winding 305 is conducting current. A different approach, however, is taken in FIG. 3. The theory underlying this different approach is now presented.

In a flyback converter, such as is partially illustrated in FIG. 3, the primary winding of a transformer, such as the primary winding of the transformer 301, may be connected through a switching system, such as the FET 317, to a source of current. This may cause current to steadily build in the primary winding 303 based on the amount of voltage which is applied and the amount of inductance in the primary winding. A corresponding voltage may be simultaneously generated on a secondary winding of the transformer, such as the secondary winding 305. However, no current may yet flow in the secondary winding because a half wave rectification system that may be attached to the secondary winding, such as the diode 307, may be reversed biased.

The current in the primary winding may continue to grow until such time as it reaches a desired peak value. At this point, the switching system may be turned off. The may cause the current through the primary winding to cease.

The magnetic field that was built up in the transformer due to the current in the primary winding may now begin to transfer to the secondary winding. This may cause the output voltage on the secondary winding to change polarity, causing the half wave switching system, such as the diode 307, to be forwarded biased. In turn, this may cause current to flow in the secondary winding.

The current in the secondary winding may begin at a peak value and decrease to zero in approximately a linear fashion. Once it reaches zero, the switching system in the primary may again be turned on. Current may then again build in the primary winding. This entire process may repeat.

This delivery current in the primary winding followed by current flowing in the secondary winding of the transformer may repeat at a very fast frequency. The frequency may be greater than 100 KHz, such as at about 200 KHz.

As indicated above, current may not flow in the secondary winding while it is flowing in the primary winding. The relative amount of time during which current flows in the secondary winding versus the amount of time during which current does not flow in the secondary winding may be referred to as the duty cycle of the current in the secondary winding.

The average amount of current which flows in the secondary winding may be proportional to the product of the peak value of the current which initially flows in the secondary winding times the duty cycle of that current. As the peak value increases, for example, the average amount of current may also increase, even if the duty cycle is not altered. Similarly, the average value of the current in the secondary winding may increase if the duty cycle increases, even if the peak value remains the same.

The peak value of the current which initially flows in the secondary winding may be proportional to the peak value of the current which is reached in the primary winding before the current in the primary winding is shut off by the switching system. Thus, the average value of the current which flows in the secondary winding may be proportional to the peak value of the current that is reached in the primary winding times the duty cycle of the current in the secondary winding.

An output current monitoring circuit may therefore be configured to generate a signal representative of the average output current in the secondary winding 305 based on the peak input current in the primary winding 303 and the duty cycle of the current in the secondary winding 305. Any circuitry may be used to measure these quantities and generate this signal. As illustrated in FIG. 3, for example, the output current monitoring circuit may include the sense resistor 319, a peak input current sensing circuit 321, a pulse width modulator 323, and a low pass filter formed by a resistor 325 and a capacitor 327.

The sense resistor 319 may produce an input current signal 330 that has a voltage that is representative of the current in the primary winding 303 of the transformer 301. The sense resistor 319 may have a relatively low resistance so as to not waste power. The voltage produced by the sense resistor 319 may be processed by the peak input current sensing circuit 321. The peak input current sensing circuit 321 may be configured to generate an output which represents the peak value of the current in the primary winding 303. To accomplish this, the peak input current sensing circuit 321 may include a sample and hold circuit. The sample and hold circuit may be configured to sample the output from the sense resistor 319 while current is flowing in the primary winding 303 and to hold the value of the current that is flowing immediately before the FET 317 is turned off. This value may be the peak value of the current in the primary winding 303 due to the fact that the current may steadily rise until the FET 317 is turned off.

A duty cycle signal 329 may be indicative of the duty cycle of current in the secondary winding 305. The duty cycle signal 329 may be derived from a memory, such as a D memory 331. The operation of the D memory 331 will be described below.

The pulse width modulator may be configured to generate an output that represents the peak input current from the peak input current sensing circuit 321 multiplied by the duty cycle signal 329, thus creating a pulse-width modulated version of the peak input current signal. The low pass filter formed by the resistor 325 and the capacitor 327 may be configured to extract the average value of the pulse-width modulated peak input current, thus creating an average output current signal 333. The average output current signal 333 may therefore represent the average output current in the secondary winding 305 because, as explained above, the average output current in the secondary winding 305 may be proportional to the average value of the peak input current in the primary winding 303 multiplied by the duty cycle of the output current in the secondary winding 305.

The low pass filter that is formed by the resistor 325 and the capacitor 327 may have a cut-off frequency that is at least five times lower than the frequency of the chopped and rectified AC voltage, such as approximately ten times lower. When the frequency of the AC voltage is 60 hertz, for example, the frequency of the chopped and rectified AC voltage may be 120 hertz. In this example, the cut-off frequency of the low pass filter formed by the resistor 325 and the capacitor 327 may therefore be approximately 12 hertz. The net effect of this low cut-off frequency may be to produce the average output current signal 333 that averages the output current in the secondary winding 305 over several cycles of the chopped and rectified AC voltage.

An amplifier 335 may be configured in connection with the capacitor 327 and the resistor 325 so as to form an integrator which integrates the difference between a desired average output current signal 337 and the average output current signal 333. The output of the amplifier 335 may be treated in the circuit as a desired peak input current signal 339, i.e., a signal representing the amount peak current in the primary winding 303 that is needed to provide the desired average output current in the secondary winding 305.

The state of the FET 317 may be controlled by the D memory 331. When the D memory 331 is set by a signal to its set S input, the Q output of the D memory output may go high. When set, this may cause the FET 317 to turn on which, in turn, may begin delivery of current into the primary winding 303 of the transformer 301.

When a signal is delivered to the reset R input of the D memory, the Q output of the D memory may go low. When reset, this may cause the FET 317 to turn off which, in turn, may stop delivery of current into the primary winding 303 of the transformer 301.

The Q output of the D memory may represent an output that is complimentary to the Q output.

A boundary detect circuit 341 may be used to set the D memory 331 The boundary detect circuit 341 may be configured to initiate current in the primary winding 303 of the transformer 301 in accordance with any one of several different types of timing schemes. For example, the boundary detect circuit 341 may be configured to initiate current in the primary winding 303 at the moment current in the secondary winding 305 reaches zero. The boundary detect circuit 341 may be configured to detect when current in the secondary winding 305 ceases by monitoring the voltage across the primary winding 303 while current is flowing in the secondary winding 305.

A comparator 343 may be configured to output a signal which resets the D memory 331 and thus turns off the FET 317 at such time as the input current signal 330 reaches the level of the desired peak input current signal 339.

When the average output current signal 333 is less than the desired average output current signal 337, the circuitry configuration that has been discussed may therefore cause the desired peak input current signal 339 to grow until such time as the average output current signal 333 reaches the level of the desired average output current signal 337. Conversely, when the average output current signal 333 is more than the desired average output current signal 337, the circuitry configuration that has been discussed may cause the desired peak input current signal 339 to get smaller until such time as the average output current signal 333 gets back down to the level of the desired average output current signal 337.

The overall effect of the circuitry which has just been described may therefore be to cause a constant average current to be delivered by the secondary winding 305 that corresponds to the desired average output current signal 337. The circuitry may do so while the output of the flyback converter is electrically isolated from the AC voltage, all without using any opto-isolator, such as an opto-isolator that is configured to provide feedback indicative of the output current from the secondary winding 305.

As indicated above, the chopped and rectified AC voltage from the output filter 111 may be used as a source of power to the primary winding 303. In this configuration, the boundary detect circuit 341 may be configured not to set the D memory 331 during the off periods of the chopped and rectified AC voltage. Correspondingly, the integrator that is formed by the amplifier 335, the resistor 325 and the capacitor 327 may be disabled during these off periods, so as not to allow the value of the integration to be changed by these off periods. In other words, the circuit illustrated in FIG. 3 may be configured to cause the average value of the output current in the secondary winding 305 to match the value represented by the desired average output current signal 337 during the on periods of the chopped and rectified AC voltage, but not during its off periods.

Separate power supply circuitry may be provided to generate a constant source of DC power from the chopped and rectified AC voltage, regardless of the chopped nature of this voltage. The output of this separate power supply circuitry may be used to power the flyback controller, including the circuitry illustrated in FIG. 3, during off periods of the chopped and rectified AC voltage, as well as during its on periods.

Figure 4:
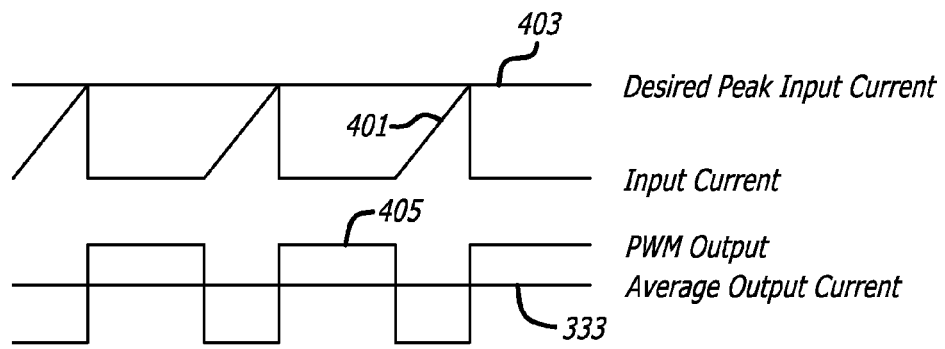
FIG. 4 illustrates selected waveforms that may be found during operation of a flyback converter containing the circuitry illustrated in FIG. 3.

FIG. 4 illustrates selected waveforms that may be found during operation of a flyback converter containing circuitry of the type illustrated in FIG. 3. As illustrated in FIG. 4, input current 401 may begin to rise each time after the FET 317 is turned on. It may continue to rise until it reaches the desired peak input current 403. Once the input current 401 reaches the desired peak input current 403, the comparator 343 may send a signal to the reset R input to the D memory 331, causing the FET 317 to turn off.

At this point, current through the secondary winding 305 may begin to flow. The duty cycle of the current which flows in the secondary winding 305 may be reflected at the $\overline{Q}$ output of the D memory 331. The pulse width modulator 323 may multiply the peak input current signal from the peak input current sensing circuit 321 by the duty cycle signal 329, thus generating the pulse-width modulated peak input current signal 405. The average value of the pulse-width modulated peak input current signal 405 may then be extracted by the low pass filter formed by the resistor 325 and the capacitor 327, thus generating the average output current signal 333. If the average output current signal 333 does not match the desired average output current signal 337, the integrator formed by the amplifier 335 and the capacitor 327 may continue to adjust the desired peak input current signal 339 until it does.

The circuitry which is illustrated in FIG. 3 may cause the current which is drawn from the AC voltage to have a wave shape which is substantially different from the AC voltage. For example, while the AC voltage is falling in value, such as when the phase angle of the AC voltage goes from 90 to 180 degrees (see FIG. 2), the circuit in FIG. 3 may cause the average current which is drawn by the flyback converter to remain substantially constant. This may result in a low power factor, such as between 0.6 and 0.7. Such a low power factor may require the utility which supplies the line voltage to provide more current than is actually needed. It may also cause problems with electromagnetic interference due to sharp current spikes.

Figure 5:
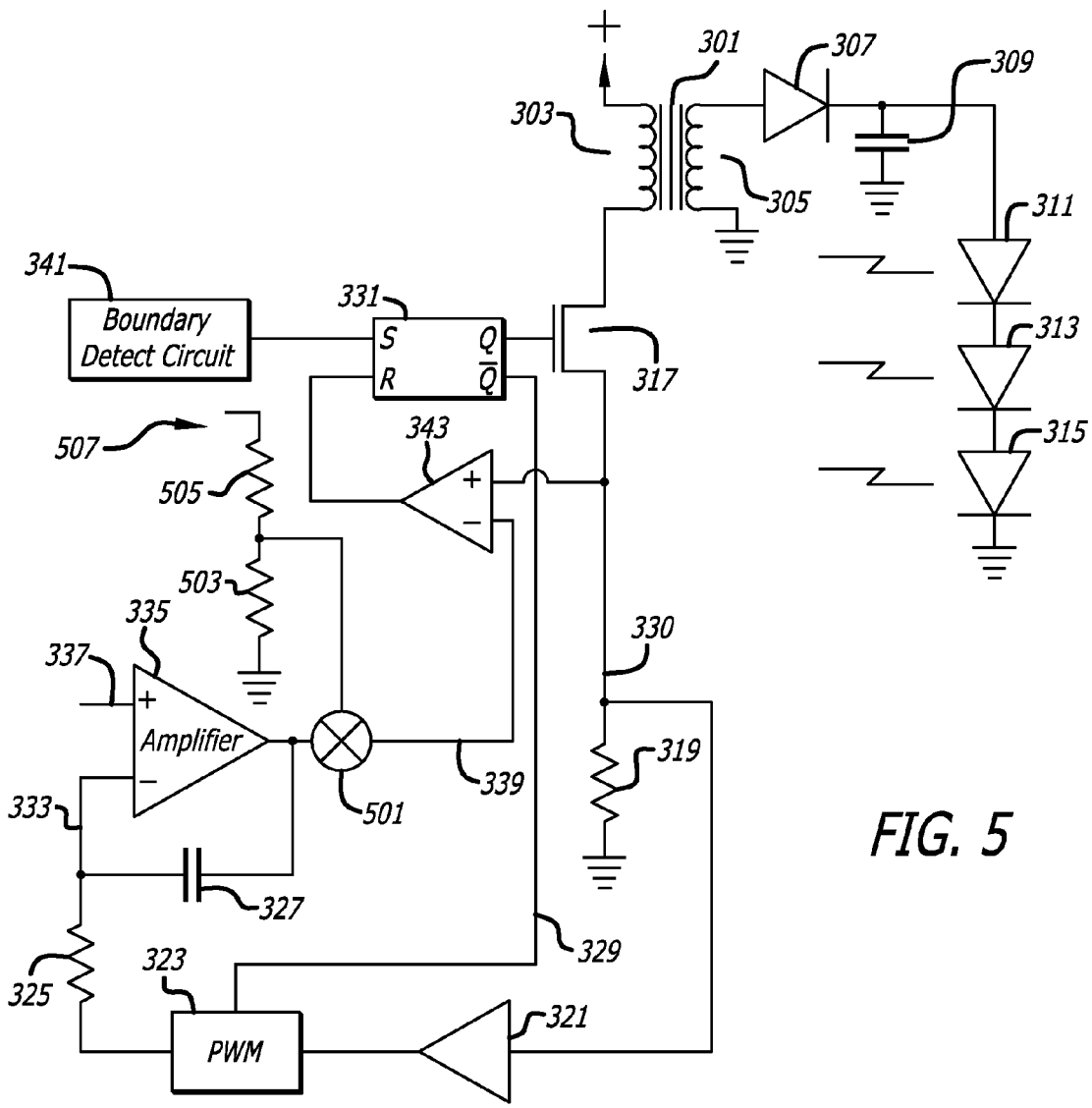
FIG. 5 illustrate a portion of the flyback converter illustrated in FIG. 3 configured to adjust the desired peak input current to effectuate power factor correction.

FIG. 5 illustrates a portion of the flyback converter illustrated in FIG. 3 configured to adjust the desired peak input current to effectuate power factor correction. As may be apparent, the circuit illustrated in FIG. 5 is the same as the circuit illustrated in FIG. 3, except that a multiplier 501 has been inserted in the output of the amplifier 335, a voltage divider network consisting of resistors 503 and 505 has been added, and a chopped and rectified AC voltage input 507 has been added.

The circuitry modification may cause the output of the integrator formed by the amplifier 335, the resistor 325, and the capacitor 327, to be multiplied by a signal representative of the chopped and rectified AC voltage. This may cause the desired peak input current signal 339 to track the instantaneous value of the chopped and rectified AC voltage. Thus, when the instantaneous value of the chopped and rectified AC voltage increases or decrease, the value of the desired peak input current signal 339 may increase and decrease along with it. This may cause the wave shape of the average current which is drawn from the chopped and rectified AC voltage, such as from the output of the output filter 113, to more closely match the chopped and rectified AC voltage, thus increasing the power factor of the circuit. At the same time, the feedback loop which remains in FIG. 5 and has been discussed above in connection with FIG. 3, may still ensure that the average output current matches the desired average output current signal 337 during each on period of the chopped and rectified AC voltage.

Figure 6:
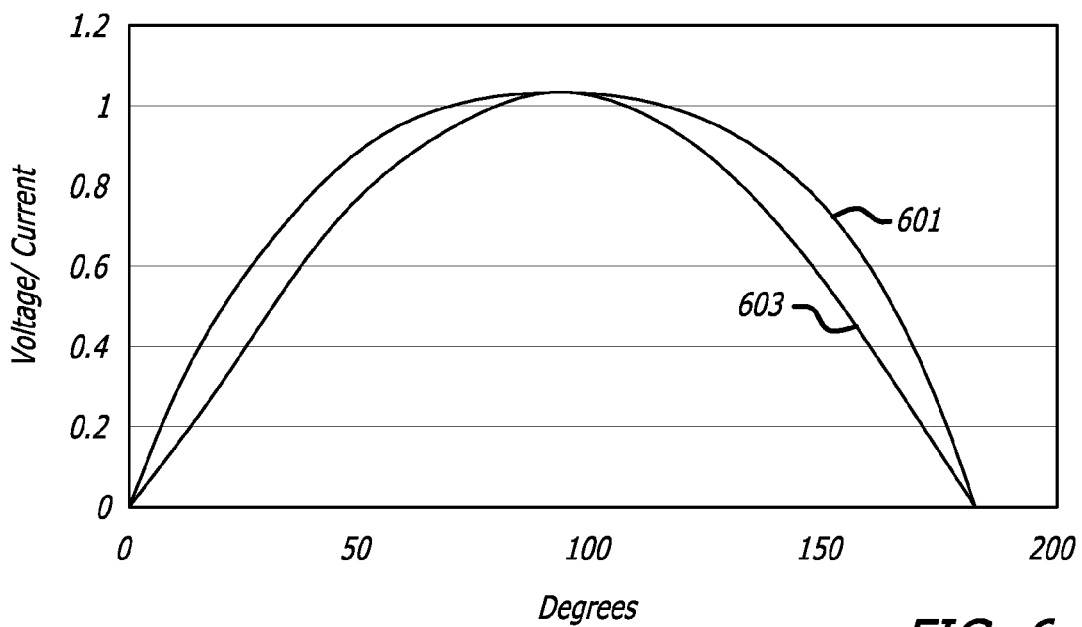
FIG. 6 illustrates power factor corrections that the circuit illustrated in FIG. 5 may provide as a function of the phase angle of the chopped AC voltage.

FIG. 6 illustrates power factor corrections that the circuit illustrated in FIG. 5 may provide as a function of the phase angle of the chopped AC voltage. As illustrated in FIG. 6, the input current 601 drawn by the flyback converter may closely track the input voltage 603 over the full range of phase angles to which the dimmer control may be set.

The power factor of the circuit illustrated in FIG. 5 may vary depending upon the output voltage of the flyback converter. The graphs illustrated in FIG. 6 represent a relationship between input current and input voltage for an output voltage of approximately 50 volts. When the output is at this voltage level, the power factor may be at least 0.8, at least 0.9, at least 0.95, or at least 0.98 at each of the possible dimmer phase angles.

Figure 7:
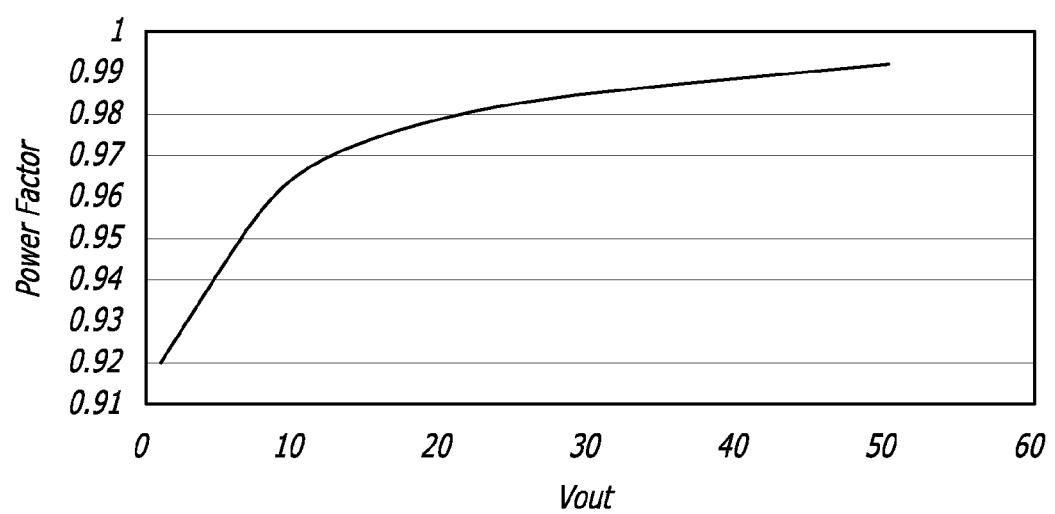
FIG. 7 illustrates power factor corrections that the circuit illustrated in FIG. 5 may provide as a function of the output voltage of the flyback converter.

FIG. 7 illustrates power factor corrections that the circuit illustrated in FIG. 5 may provide as a function of the output voltage of the flyback converter. As can be seen from FIG. 7, the power factor may remain very high over a wide range of output voltages.

The circuitry in FIG. 5 seeks to provide power factor correction by causing the desired peak input current to track changes in the input voltage. However, the average input current may not be directly proportional to the desired peak input current. The average input current may also be a function of the duty cycle of the input current to the primary winding 303, which may change as function of changes in the input voltage. Thus, more power factor correction may be achieve by causing the desired average input current to the primary winding 303 to track changes in the input voltage, instead of the desired peak input current.

Figure 8:
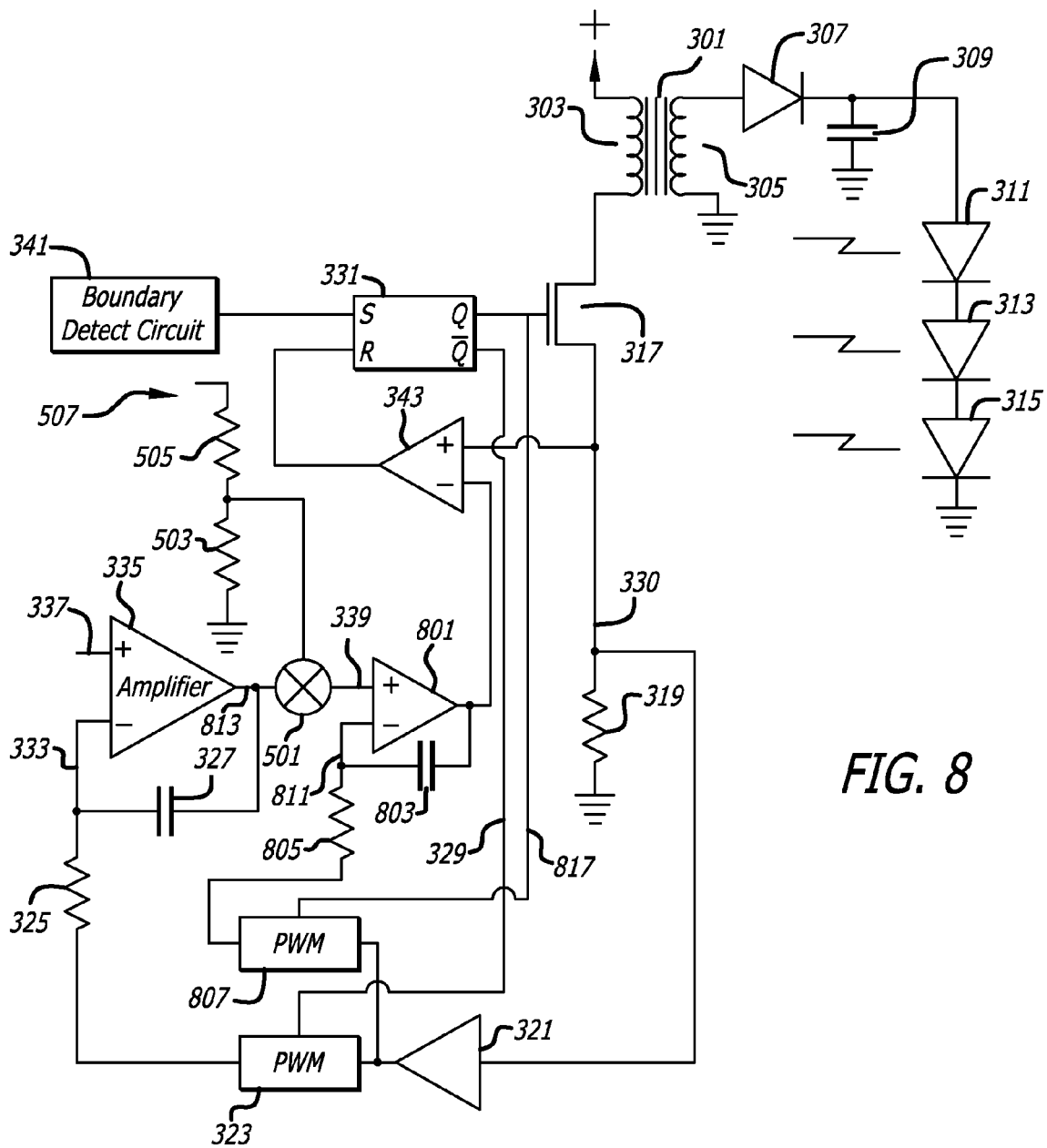
FIG. 8 illustrates the portion of the flyback converter illustrated in FIG. 5 configured to adjust the desired average peak input current to effectuate power factor correction.

FIG. 8 illustrates the portion of the flyback converter illustrated in FIG. 5 configured to adjust the desired average peak input current to effectuate power factor correction. As may be apparent, the circuit illustrated in FIG. 8 is the same as the circuit illustrated in FIG. 6, except that a second integrator has been added consisting of an amplifier 801, a capacitor 803, and resistor 805, along with a second pulse width modulator 807.

An input current monitoring circuit may be configured to generate a signal that is representative of an average input current to the primary winding. As illustrated in FIG. 8, the input current monitoring circuit may include the sense resistor 319, the peak input current sensing circuit 321, the second pulse width modulator 807, and a low pass filter formed by the resistor 805 and the capacitor 803. In this case, the second pulse width modulator 807 may multiply the peak input current that is sensed by the peak input current sensing circuit 321 by a duty cycle signal 815 that is representative of the duty cycle of current in the primary winding 303. The duty cycle signal 815 may be derived from the Q output of the D memory 331. This pulse-width modulated signal may be filtered by the low pass filter formed by the resistor 805 and the capacitor 803, thus generating an average input current signal 811 at the minus input to the amplifier 801. The low pass filter may be configured to have a cut-off frequency that is between the frequency of the switching signal to the FET 317 and the frequency of the chopped and rectified AC voltage. For example, when the switching signal is at approximately 200 KHz and the chopped and rectified AC voltage is at approximately 120 hertz, the cut-off frequency of the low pass filter may be approximately, 10 KHz.

This configuration may alter the nature of what the output from the multiplier 501 represents. In FIG. 8, the output from the multiplier 501 may now represent a desired average input current signal 815. The amplifier 801, the capacitor 803, and the resistor 805 may form a second integrator which integrates the difference between the desired average input current 815 and the average input current signal 811, thus generating the desired peak input current signal 339.

By causing the desired average input current signal to track the input voltage, rather than the desired peak input current signal, the power factor may be increased to at least 0.99 for all settings of the dimmer control 105.

The circuits illustrated in FIGS. 1, 3, 5, and 8 may generate a ripple in the output current that is delivered to the LEDs. The amount of this ripple may depend upon the amount of output capacitance which is used in the output filter 123, such as in the capacitor 309, as well as the amount of voltage and current that are required by the LEDs.

The ripple may have two components. The first component may be due to the switching signal from the flyback controller. However, this may be very high in frequency, such as at about 200 KHz, and thus easily filtered by small values in output capacitance.

The second component may be due to the chopped and rectified AC voltage. This second component may be much lower in frequency, such as at about 120 hertz, and may require extremely large values of capacitance to filter. For example, a 10 watt set of LEDs that are operated at 50 volts may require a capacitance in excess of 10,000 microfarads to adequately filter the 120 hertz ripple. Such a capacitance can be expensive, bulky, and prone to failure.

Figure 9:
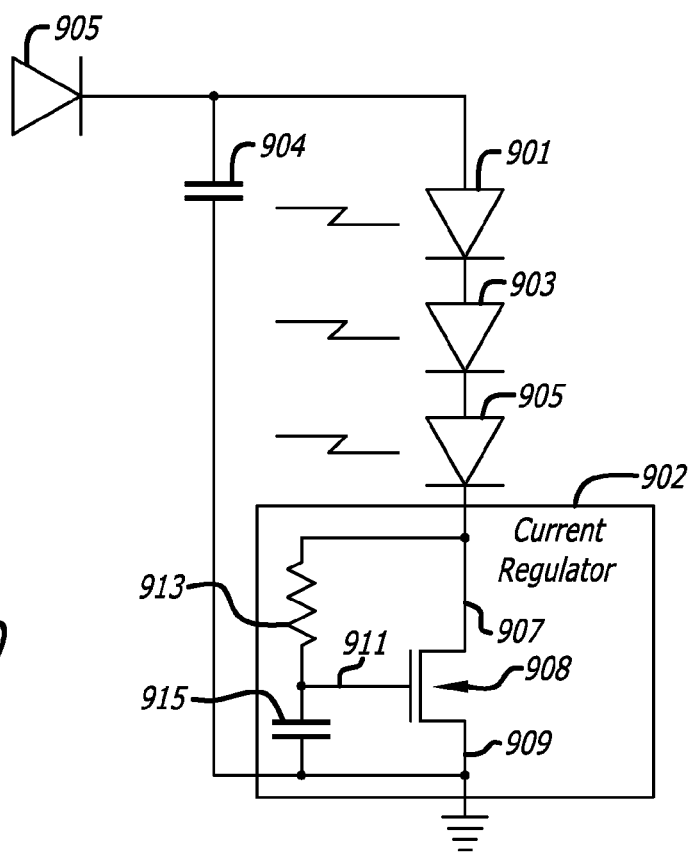
FIG. 9 illustrates a current ripple reduction circuit.

FIG. 9 illustrates a current ripple reduction circuit. The circuit illustrated in FIG. 9 may be used in conjunction with the circuits illustrated in FIGS. 1, 3, 5, and 8, as well as in connection with other types of LED circuits. Similarly, the circuits illustrated in FIGS. 1, 3, 5, and 8 may be used in connection with other types of current ripple reduction circuits.

The current ripple reduction circuit may be connected to a power supply. The power supply may include a rectifying diode, such as a diode 906.

The current ripple reduction circuit may be connected to one or more LEDs that are connected in series, in parallel, or in series and parallel. For example, and as illustrated in FIG. 9, LEDs 901, 903, and 905 may be connected in series. The LEDs 901, 903, and 905 may be any of the types of LEDs discussed above, and a different number may be used instead.

The current ripple reduction circuit may include a capacitance, such as a capacitor 904. The capacitor 904 may be configured to filter output from a secondary winding of a transformer in a flyback converter after it is rectified by a diode, such as the diode 906. The value of the capacitance may be selected so as to filter high frequency current ripple caused by a switching signal in the flyback converter, but to only partially filter current ripple caused by the chopping of a low frequency chopped and rectified AC voltage source, such as by a dimmer control. For example, a value in the range of 1 to 1000 microfarads or from 2 to 20 microfarads may be used. The value of the capacitor 904 may be such as to allow the ripple in the output voltage across this capacitance that is attributable to the chopped and rectified AC voltage to be as much as 10% of the peak value of the output voltage.

The current ripple reduction circuit may include a current regulator, such as a current regulator 902, that is connected in series with the LEDs. The current regulator 902 may be configured to substantially reduce fluctuations in the current which flows through the LEDs due to the low frequency ripple component of the output current, but not fluctuations in the current which flows through the LEDs due to changes in an average value of the output current.

The current regulator 902 may include a controllable, constant current source, such as a FET 908. The FET 908 may be configured to conduct a constant amount of current from a source 907 through a drain 909 that is approximately proportional to an input voltage at a gate 911. The input voltage to the gate 911 may be developed from a low pass filter that may include a resistance and a capacitance, such as a resistor 913 and a capacitor 915, respectively.

The low pass filter may be configured to deliver a voltage to the gate 911 of the FET 908 that is substantially proportional to the average value of the output current with the low frequency ripple component being substantially attenuated. In order to accomplish this, the low pass filter may be configured to have a cut-off frequency that is at least five times less than the low frequency ripple of the chopped and rectified AC voltage, such as approximately ten times less.

Although the LEDs 901, 903, and 905 are illustrated as being in series with the source of the FET 908, they may be instead be in series with the drain 909 of the FET 908. Also, other types of current regulators may be used, instead of the one illustrated in FIG. 9.

Figure 10:
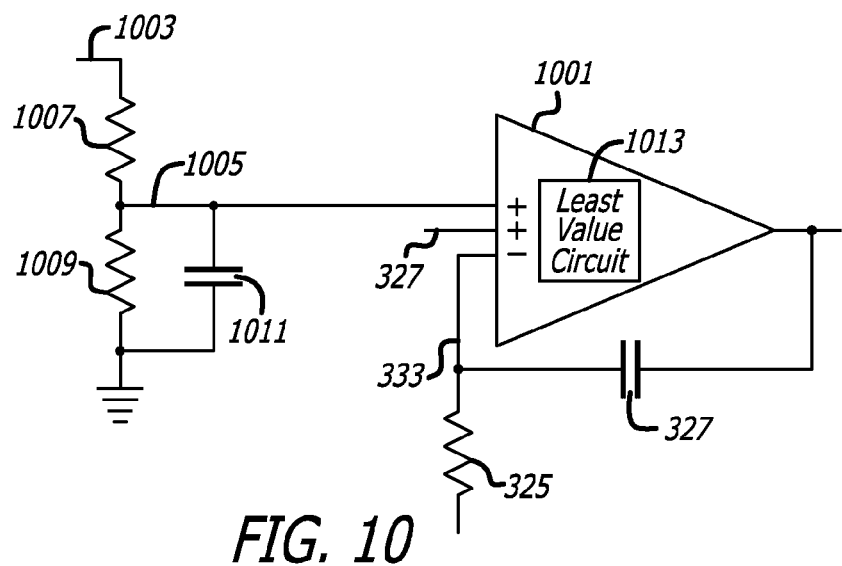
FIG. 10 illustrates part of a flyback controller that may be used in a flyback converter driven by a dimmer control to enhance the perceived linearity between changes in settings of the dimmer control and corresponding changes in the intensity of light from one or more LEDs driven by the flyback converter.

FIG. 10 illustrates part of a flyback controller that may be used in a flyback converter driven by a dimmer control to enhance the perceived linearity between changes in the settings of the dimmer control and corresponding changes in the intensity of light from one or more LEDs driven by the flyback converter. The circuitry illustrated in FIG. 10 may be used in connection with the circuits illustrated in FIGS. 3, 5, and 8, by replacing the amplifier 335 with an amplifier 1001 and by adding the additional components that are illustrated in FIG. 10 and are now described.

As illustrated in FIG. 105 a tracking input 1003 may be configured to receive a dimmer output tracking signal that is representative of the instantaneous magnitude of the output from a dimmer control. The dimmer output tracking signal may, for example, be a scaled version of the chopped and rectified AC voltage that is delivered by the output of the rectification system 111 illustrated in FIG. 1. The rectification system 111 may, for example, be a full wave bridge rectifier.

An averaging circuit may be configured to average the dimmer output tracking signal at the tracking input 1003 so as to generate an average dimmer output signal 1005 that is representative of an average of the dimmer output tracking signal. The averaging circuit may include a low pass filter which may include a resistor 1007, a resistor 1009, and a capacitor 1011. The low pass filter may be configured to have a cut-off frequency that is at least five times less than the frequency of the dimmer output tracking signal, such as approximately 10 times less than this frequency. For example, the dimmer output tracking signal may have a frequency of about 120 hertz, in which event the low pass filter may have a cut-off frequency of about 12 hertz.

The amplifier 1001 may be configured with the resistor 325 and the capacitor 327 so as to function as integrator. The amplifier 1001 may include a least value circuit 1013 configured to output the lesser of the desired average output current signal 337 and the average dimmer output signal 1005. The amplifier 1001 may be configured to integrate the difference between the output of the least value circuit 1013 and the average output current signal 333.

The net effect of this circuitry modification may be to substitute the average dimmer output signal 1005 for the desired average output current signal 337 at such times as the average dimmer output signal 1005 is less than the desired average output current signal 337. This may help ensure that the flyback converter does not try and maintain the output current at a high level after a setting on the dimmer control has been adjusted to call for a lower current output.

The desired average output current signal 337 may function as a threshold in connection with the phase angle of the chopped AC voltage from the dimmer control 105. For example, the desired average output current signal 337 may be set to exceed the average dimmer signal 1005 at a 0 degree phase angle. This may cause the average dimmer signal 1005 to control the average current output of the flyback converter throughout all of the various phase angle settings of the dimmer control.

The desired average output current signal 337 may instead be set to equal the average dimmer signal 1005 at a phase angle that is between 0 and 180 degrees, such as at about 90 degrees. With this setting, the desired average output current signal 337 may control the desired average output current for all phases angles that are less than 90 degrees, while the average dimmer signal 1005 may control the desired average output current at all larger phase angles. The desired average output current signal 337 may instead be set to equal the average dimmer signal 1005 at other phase angles, such as at 45 degrees.

Figure 11:
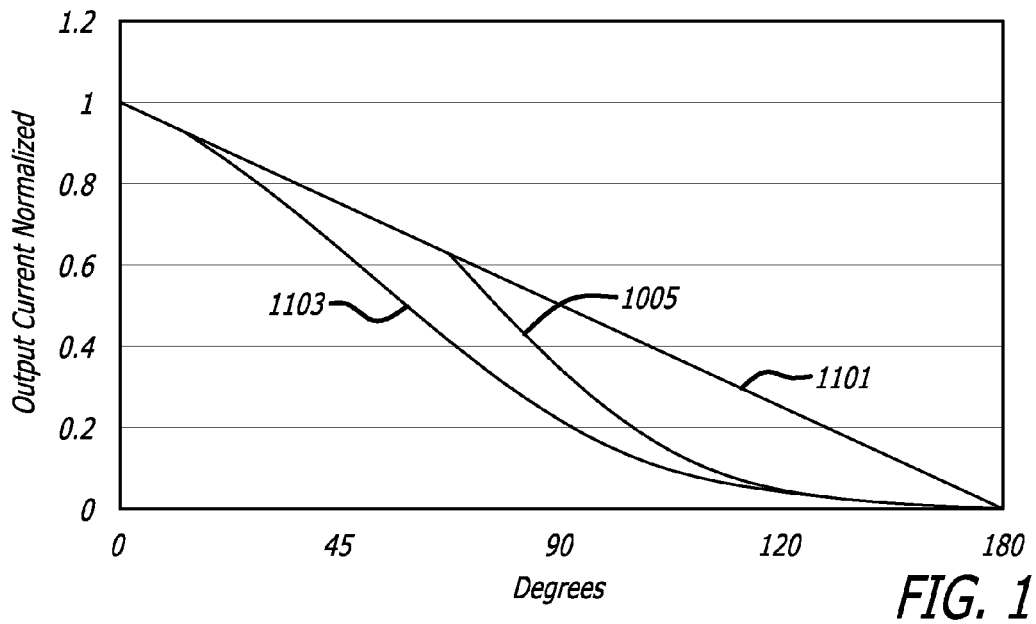
FIG. 11 is a graph of output current as a function of dimmer control settings for various flyback converter designs.

FIG. 11 is a graph of output current as a function of dimmer control settings for various flyback converter designs. A flyback converter design that lacks the circuitry illustrated in FIG. 10 may have a linear relationship between its output current and the phase angle of the dimmer control setting, as illustrated by a straight line 1101 in FIG. 11. If the desired average output current signal 337 is set to exceed the average dimmer signal 1005 at a 0 degree phase angle, a scalloped curve 1103 may be illustrative of the relationship between the setting of the dimmer and the current output of the flyback converter. If instead the desired average output current signal 337 is set to equal the average dimmer control signal 1005 at a phase angle of about 90 degrees, then the bifurcated curve 1105 may illustrate the relationship between the setting of the dimmer control and the output current.

Using such a "cross-over" setting may provide greater immunity to noise in the line voltage during low phase angle settings of the dimmer control. Setting the cross-over point at about 90 degrees may also cause the intensity of light from the LEDs to appear to a human eye to track changes in the setting of the dimmer control for phase angles larger than 90 degrees in a fashion that varies more linearly with the setting of the dimmer control. This may occur because of the non-linear manner in which the human brain interprets changes in luminance levels.

As indicated in the foregoing Description of Related Art, a dimmer control may leak current while its triac is not firing. This may cause the voltage in the flyback converter to rise during off periods of the chopped and rectified AC voltage. In turn, this may create noise, flickering, and/or other problems or concerns.

Figure 12:
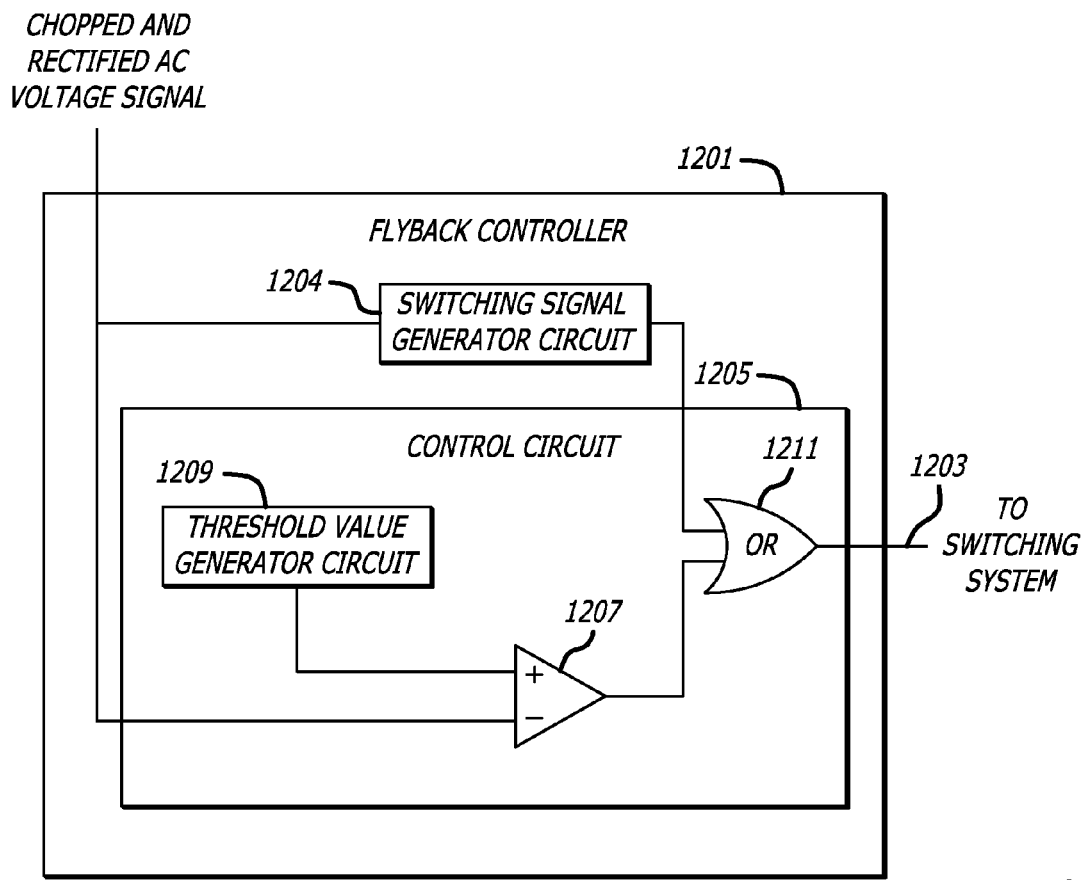
FIG. 12 illustrates a flyback controller configured to prevent voltage buildup in a flyback converter that is being driven by a dimmer control due to leakage in the dimmer control.

FIG. 12 illustrates a flyback controller configured to prevent voltage buildup in a flyback converter that is being driven by a dimmer control due to leakage in the dimmer control. The features that are illustrated in FIG. 12 and that will now be discussed may be used in connection with the flyback controllers or portions thereof which are illustrated in FIGS. 1, 3, 5, 8, and 10, or in any other type of flyback controller. Similarly, the flyback controllers or portions thereof which are illustrated in FIGS. 1, 3, 5, 8, and 10 may be used in connection with other types of circuitry to prevent voltage buildup due to leakage in the dimmer control.

As illustrated in FIG. 12, a flyback controller 1201 may be configured to generate a switching signal 1203 that may be delivered to a switching system, such as was described above in connection with FIGS. 1, 3, 5 and/or 8. The flyback controller may have a switching signal generator circuit 1204 that may be configured to generate the switching signal 1203 to conform to any desired flyback controller switching signal timing, such as one of the timings discussed above in connection with FIGS. 1-10. The switching signal generator circuit 1204 may include any type of circuit, such as one of the types of circuits discussed above in connection with FIGS. 1-10.

The flyback controller 1201 may have a control circuit 1205. The control circuit may have a comparator 1207, a threshold value generator circuit 1209, and an OR gate 1211. The threshold value generator circuit 1209 may be configured to generate a threshold value above which a signal representative of the chopped and rectified AC voltage may be considered to be in an on period, and below which the signal that is representative of the chopped and rectified AC voltage may be considered to be in an off period. For example, the threshold may be set at less than 10% of the peak value of the signal which is representative of the chopped and rectified AC voltage, at less than 5% of this peak value, or at some other value.

The comparator 1207 may be configured to compare the instantaneous value of the signal that is representative of the chopped and rectified AC voltage with the threshold generated by the threshold value generator circuit 1209. During such time as the signal that is representative of the chopped and rectified AC voltage is higher than the threshold, no signal may be delivered to the OR gate 1211, causing the switching signal 1203 to be governed by the output from the switching signal generator circuit 1204. During such times as the signal that is representative of the chopped and rectified AC voltage is less than the threshold, however, the comparator 1207 may generate a positive output, causing the switching signal 1203 to be in its on state, regardless of the signal from the switching signal generator circuit 1204.

Figure 13:
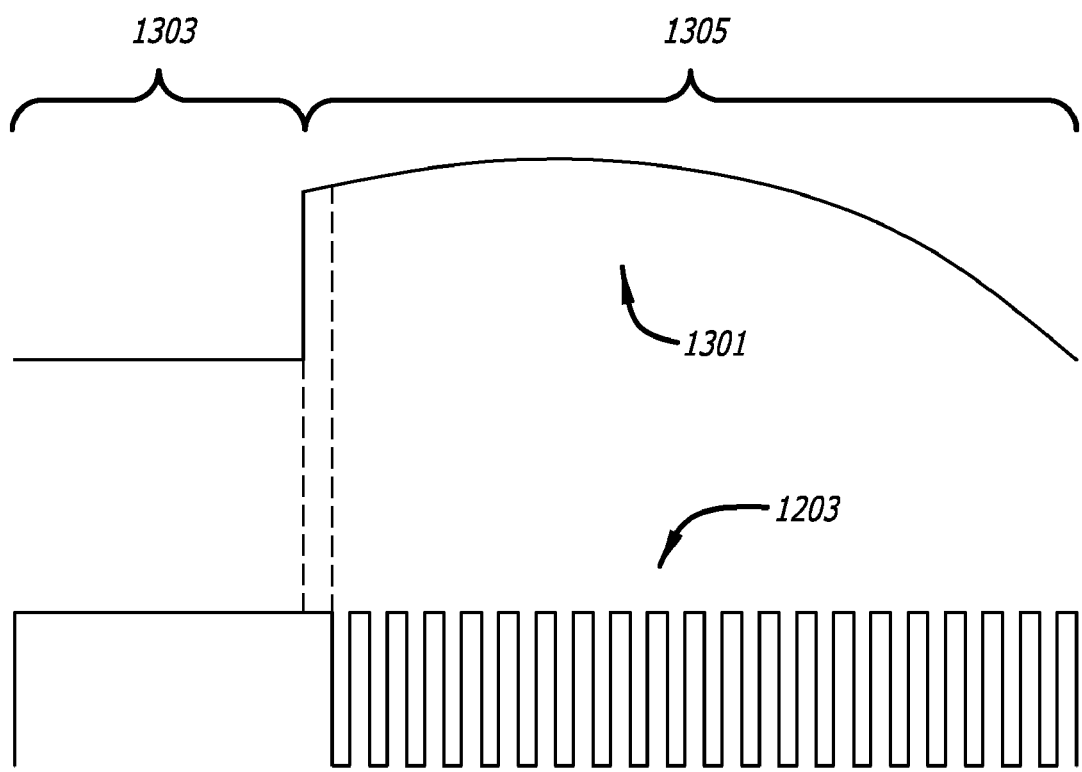
FIG. 13 illustrates waveforms that may be present in the flyback controller illustrated in FIG. 12.

FIG. 13 illustrates wave forms that may be present in the flyback controller illustrated in FIG. 12. As illustrated in FIG. 13, the switching signal 1203 may remain high during a period 1303 when the chopped and rectified AC voltage 1301 is off. When the chopped and rectified AC voltage 1301 is firing during a period 1305, on the other hand, the switching signal 1203 may oscillate as it normally does so as to cause the average output current in the secondary winding of the flyback controller to be at a desired level.

As also illustrated in FIG. 13, the switching signal 1203 may remain high at the commencement of the period 1305, thereby beginning the first oscillation of the switching signal after the chopped and rectified AC voltage switches from an off period to an on period.

The net effect of the circuit illustrated in FIG. 12 may be to load the dimmer control with the primary winding of the transformer at such times as the dimmer control is not firing. This may bleed any leakage current and thus prevent a voltage buildup during such off periods, without requiring any additional active high voltage device or devices. Other circuitry techniques for effectuating the same type of signal control of the switching system may be used in addition or instead.

The various components which have been described may be packaged in any way. For example, the components that comprise the flyback controller may be packaged in a single integrated circuit with other active and passive components, a set of integrated circuits with other active and passive components, or a set of discrete transistor circuits with other active and passive components.

All of the various circuits that have been described may be used in connection with one another in any and all combinations.

The components, steps, features, objects, benefits and advantages that have been discussed are merely illustrative. None of them, nor the discussions relating to them, are intended to limit the scope of protection in any way. Numerous other embodiments are also contemplated, including embodiments that have fewer, additional, and/or different components, steps, features, objects, benefits and advantages. The components and steps may also be arranged and ordered differently.

The phrase "means for" when used in a claim embraces the corresponding structures and materials that have been described and their equivalents. Similarly, the phrase "step for" when used in a claim embraces the corresponding acts that have been described and their equivalents. The absence of these phrases means that the claim is not limited to any of the corresponding structures, materials, or acts or to their equivalents.

Nothing that has been stated or illustrated is intended to cause a dedication of any component, step, feature, object, benefit, advantage, or equivalent to the public, regardless of whether it is recited in the claims.

In short, the scope of protection is limited solely by the claims that now follow. That scope is intended to be as broad as is reasonably consistent with the language that is used in the claims and to encompass all structural and functional equivalents.

What is claimed is:

1. A flyback controller for generating a switching signal that causes a switching system in a flyback converter to deliver current to a primary winding of a transformer in the flyback converter while the switching signal is in an on state and to stop delivering that current while the switching signal is in an off state, the flyback controller comprising:
    a dimmer input configured to receive a dimmer signal reflective of a chopped and rectified AC voltage, each cycle of which has an off period which is substantially attenuated but not always zero due to leakage of a dimmer control from which the chopped AC voltage originates and an on period which substantially tracks the AC voltage, the ratio of the off period to the on period being dependent upon a setting of the dimmer control; and
    a control circuit configured to generate the switching signal based on the dimmer signal from the dimmer input such that the switching signal:
        controllably oscillates between its on and off states during the on periods of the chopped and rectified AC voltage so as to controllably regulate the current that is delivered by a secondary winding of the transformer; and
        is in the on state during the off periods of the chopped and rectified AC voltage, thereby preventing a voltage build up from the dimmer control leakage.

2. The flyback controller of claim 1 wherein the control circuit includes a comparator configured to compare the dimmer signal from the dimmer input with a threshold value and wherein the control circuit is configured to indicate that the chopped and rectified AC voltage is in an on period when the comparator indicates that the chopped and rectified AC voltage is greater than the threshold and is in an off period when the comparator indicates that the chopped and rectified AC voltage is less than the threshold.

3. The flyback controller of claim 2 wherein the AC voltage has a maximum and wherein the threshold is less than ten percent (10%) of the maximum.

4. The flyback controller of claim 3 wherein the threshold is less than five percent (5%) of the maximum.

5. The flyback controller of claim 1 wherein the control circuit is configured to cause the switching signal to oscillate during the on periods of the chopped and rectified AC voltage in a manner that causes the secondary winding of the transformer to deliver an average current that tracks the average value of the chopped and rectified AC voltage in a linear or non-linear fashion.

6. The flyback controller of claim 5 wherein the control circuit is configured to cause the tracking to be in a substantially linear fashion.

7. The flyback controller of claim 5 wherein the control circuit is configured to provide power factor correction.

8. The flyback controller of claim 1 wherein the control circuit is configured to cause the switching signal to remain in the on state after the chopped and rectified AC voltage switches from the off period to the on period, thereby beginning the first cycle of the switching signal.

9. A powered LED circuit comprising:
    a flyback converter comprising:
        a rectification system configured to produce a chopped and rectified AC voltage by rectifying a chopped AC voltage from a dimmer control, each cycle of which has an off period which is substantially attenuated but not zero due to leakage of the dimmer control and an on period which substantially tracks the AC voltage, the ratio of the off period to the on period being dependent upon a setting of the dimmer control;
        a transformer having a primary winding and a secondary winding;
        a switching system configured to controllably deliver current into the primary winding of the transformer; and
        a flyback controller configured to generate a switching signal that causes the switching system to deliver current to the primary winding of the transformer while the switching signal is in an on state and to stop delivering that current while the switching signal is in an off state, the flyback controller comprising a control circuit configured to generate the switching signal based on the chopped and rectified AC voltage such that the switching signal:
            controllably oscillates between its on and off states during the on periods of the chopped and rectified AC voltage so as to controllably regulate the current that is delivered by the secondary winding of the transformer; and
            is in the on state during the off periods of the chopped and rectified AC voltage, thereby preventing a voltage build up from the dimmer control leakage; and
        one or more LEDs configured to receive current that is delivered by the secondary winding of the transformer.

10. The powered LED circuit of claim 9 wherein the control circuit includes a comparator configured to compare the dimmer signal from the dimmer input with a threshold value and wherein the control circuit is configured to indicate that the chopped and rectified AC voltage is in an on period when the comparator indicates that chopped and rectified AC voltage is greater than the threshold and is in an off period when the comparator indicates that the chopped and rectified AC voltage is less than the threshold.

11. The powered LED circuit of claim 10 wherein the AC voltage has a maximum and wherein the threshold is less than ten percent (10%) of the maximum.

12. The powered LED circuit of claim 11 wherein the threshold is less than five percent (5%) of the maximum.

13. The powered LED circuit of claim 9 wherein the control circuit is configured to cause the switching signal to oscillate during the on periods of the chopped and rectified AC voltage in a manner that causes the secondary winding of the transformer to deliver an average current that tracks in a linear or non-linear fashion the average value of the chopped and rectified AC voltage.

14. The powered LED circuit of claim 13 wherein the control circuit is configured to cause the tracking to be in a substantially linear fashion.

15. The powered LED circuit of claim 13 wherein the control circuit is configured to provide power factor correction.

16. The powered LED circuit of claim 9 wherein the rectification system has an output that is filtered by capacitance in an amount that is insufficient to substantially alter the fundamental wave shape of the chopped and rectified AC voltage.

17. The powered LED circuit of claim 16 wherein the capacitance is no more than 1 microfarad.

18. The powered LED circuit of claim 9 further comprising a dimmer control configured to produce the chopped AC voltage.

19. The powered LED circuit of claim 18 in which the dimmer control includes a triac configured to product the chopped AC voltage.

20. The powered LED circuit of claim 9 wherein the control circuit is configured to cause the switching signal to remain in the on state thereby beginning the first cycle of the switching signal after the chopped and rectified AC voltage switches from the off period to the on period.

21. A flyback controller for generating a switching signal that causes a switching system in a flyback converter to deliver current to a primary winding of a transformer in the flyback converter while the switching signal is in an on state and to stop delivering that current while the switching signal is in off state, the flyback controller comprising:
  means for receiving a dimmer signal reflective of a chopped and rectified AC voltage, each cycle of which has an off period which is substantially attenuated but not zero due to leakage of a dimmer control from which the chopped AC voltage originates and an on period which substantially tracks the AC voltage, the ratio of the off period to the on period being dependent upon a setting of the dimmer control; and
  means for generating the switching signal based on the dimmer signal from the means for receiving such that the switching signal:
    controllably oscillates between its on and off states during the on periods of the chopped and rectified AC voltage so as to controllably regulate the current that is delivered by a secondary winding of the transformer; and
    is in the on state during the off periods of the chopped and rectified AC voltage thereby preventing a voltage build up from the leakage.

22. A powered LED circuit comprising:
  a flyback converter comprising:
    means for producing a chopped and rectified AC voltage from a chopped AC voltage from a dimmer control, each cycle of which has an off period which is substantially attenuated but not zero due to leakage of the dimmer control and an on period which substantially tracks the AC voltage, the ratio of the off period to the on period being dependent upon a setting of the dimmer control;
    a transformer having a primary winding and a secondary winding;
    means for controllably delivering current into the primary winding of the transformer; and
    means for generating a switching signal that causes the means for controllably delivering current to deliver current to the primary winding of the transformer while the switching signal is in an on state and to stop delivering that current during while the switching signal is in off state, the means for generating causing the switching signal to be based on the chopped and rectified AC voltage such that the switching signal:
      controllably oscillates between its on and off states during the on periods of the chopped and rectified AC voltage so as to controllably regulate the current that is delivered by the secondary winding of the transformer; and
      is in the on state during the off periods of the chopped and rectified AC voltage, thereby preventing a voltage build up from the leakage; and
  one or more LEDs configured to receive current that is delivered by the secondary winding of the transformer.

* * * * *